United States Patent
Lecue et al.

(10) Patent No.: US 12,080,043 B2
(45) Date of Patent: Sep. 3, 2024

(54) ENHANCED IMAGE OBJECT DETECTION USING SEMANTIC KNOWLEDGE GRAPH AUGMENTATION

(71) Applicant: THALES CANADA INC., Toronto (CA)

(72) Inventors: Freddy Lecue, Montreal (CA); David Beach, Toronto (CA); Tanguy Pommellet, Toronto (CA)

(73) Assignee: THALES CANADA INC., Toronto (CA)

( * ) Notice: Subject to any disclaimer, the term of this patent is extended or adjusted under 35 U.S.C. 154(b) by 659 days.

(21) Appl. No.: 17/184,159

(22) Filed: Feb. 24, 2021

(65) Prior Publication Data

US 2021/0264226 A1 Aug. 26, 2021

Related U.S. Application Data

(60) Provisional application No. 62/980,657, filed on Feb. 24, 2020.

(51) Int. Cl.
| | |
|---|---|
| *G06V 10/44* | (2022.01) |
| *G06F 16/901* | (2019.01) |
| *G06N 3/042* | (2023.01) |
| *G06N 3/08* | (2023.01) |
| *G06V 10/82* | (2022.01) |
| *G06V 30/19* | (2022.01) |
| *G06V 30/262* | (2022.01) |
| *G06V 20/58* | (2022.01) |

(52) U.S. Cl.
CPC ........ *G06V 10/454* (2022.01); *G06F 16/9024* (2019.01); *G06N 3/042* (2023.01); *G06N 3/08* (2013.01); *G06V 10/82* (2022.01); *G06V 30/19173* (2022.01); *G06V 30/274* (2022.01); *G06V 20/58* (2022.01)

(58) Field of Classification Search
None
See application file for complete search history.

(56) References Cited

U.S. PATENT DOCUMENTS

| | | |
|---|---|---|
| 7,274,822 B2 | 9/2007 | Zhang et al. |
| 8,538,081 B2 | 9/2013 | Ding et al. |

(Continued)

FOREIGN PATENT DOCUMENTS

| | | | | |
|---|---|---|---|---|
| CN | 110084296 A | | 8/2019 | |
| CN | 108038498 B | * | 9/2021 | ........... G06K 9/6201 |

OTHER PUBLICATIONS

Translation of CN108038498B obtained by Google Patents, Originally filed Dec. 2017, and Published May 15, 2018, Translation obtained online: https://patents.google.com/patent/CN108038498B/en?oq=CN108038498B (Year: 2018).*

(Continued)

*Primary Examiner* — Tahmina N Ansari
(74) *Attorney, Agent, or Firm* — HAUPTMAN HAM, LLP (57) ABSTRACT

A method of semantic object detection in an image dataset includes extracting semantic links relevant to the image dataset. Objects are detected in the image dataset and confidence scores are assigned to the detected objects. The semantic object detection compares the detected objects with the semantic links and augments the confidence scores based on the semantic links between the detected objects.

20 Claims, 5 Drawing Sheets

(56) References Cited

U.S. PATENT DOCUMENTS

| | | | |
|---|---|---|---|
| 8,666,198 | B2 | 3/2014 | Shochat et al. |
| 9,020,268 | B2 | 4/2015 | Hutter et al. |
| 9,152,888 | B2 | 10/2015 | Kenyon et al. |
| 10,304,193 | B1 | 5/2019 | Wang et al. |
| 10,339,595 | B2 | 7/2019 | Glaser et al. |
| 10,346,723 | B2 | 7/2019 | Han et al. |
| 10,373,019 | B2 | 8/2019 | Nariyambut Murali et al. |
| 2016/0055409 | A1 | 2/2016 | Majumdar et al. |
| 2017/0116466 | A1 | 4/2017 | Resnick et al. |
| 2017/0132821 | A1 | 5/2017 | Valliani et al. |
| 2017/0351905 | A1 | 12/2017 | Wang et al. |
| 2018/0114098 | A1 | 4/2018 | Desai et al. |
| 2018/0349748 | A1 | 12/2018 | Pham |
| 2021/0166426 | A1* | 6/2021 | Mccormac .............. G06T 7/579 |
| 2021/0264226 | A1* | 8/2021 | Lecue .................... G06N 3/08 |

OTHER PUBLICATIONS

Li et al., "Deep Contrast Learning for Salient Object Detection", Computer Vision Foundation, Mar. 7, 2016. Retrieved from http://openaccess.thecvf.com/content_cvpr_2016/papers/Li_Deep_Contrast_Learning_CVPR_2016_paper.pdf.

Zhang Dehai et al., "Knowledge Graph-Based Image Classification Refinement", IEEE Access, vol. 7, Apr. 24, 2019, pp. 57678-57690.

Extended European Search Report issued in corresponding European Application No. 21761675.4, dated Jun. 30, 2023, pp. 1-8, Munich, Germany.

\* cited by examiner

ENHANCED IMAGE OBJECT DETECTION USING SEMANTIC KNOWLEDGE GRAPH AUGMENTATION

PRIORITY CLAIM AND CROSS-REFERENCE

The present application claims the priority benefit of U.S. Provisional Patent Application No. 62/980,657, filed Feb. 24, 2020, the entirety of which is hereby incorporated by reference.

BACKGROUND

Object detection processes locate the presence of objects using a bounding box and types or classes of the located objects in an image. Object detection processes receive as input an image with one or more objects, such as a photograph and output one or more bounding boxes, a class label for each bounding box and a confidence score.

Deep Neural Networks (DNN) perform well on a variety of pattern-recognition tasks, such as semantic segmentation and visual classification. DNNs rely on sophisticated machine learning models trained on massive datasets with respect to scalable, high-performance infrastructures, creating and using decision systems that are not rationally explainable. In particular, DNNs do not apply context and semantic relationships between objects to make identifications.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1A:
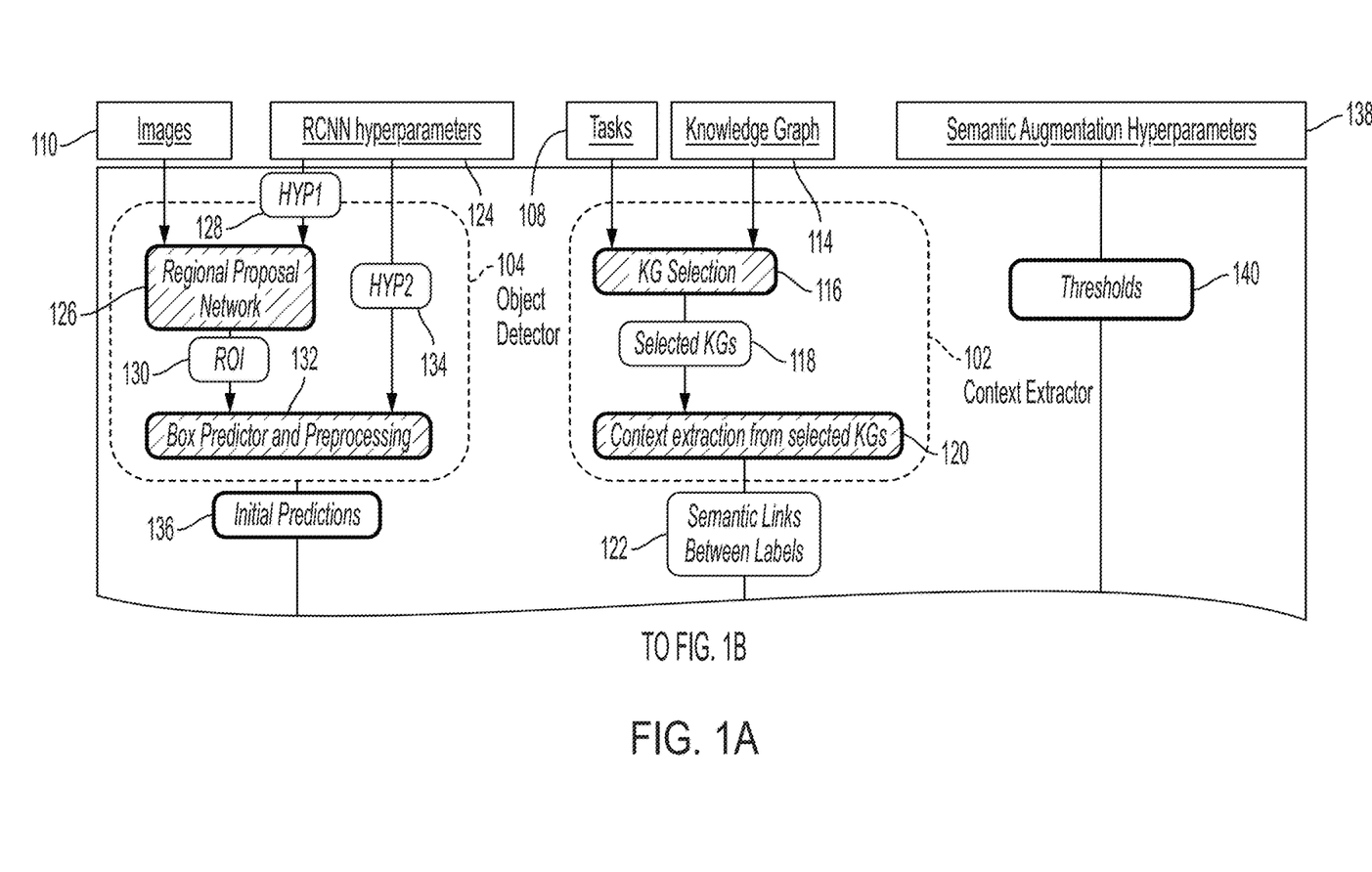
FIG. 1 is a flowchart of a semantic object detection method, in accordance with some embodiments.
Figure 1B:
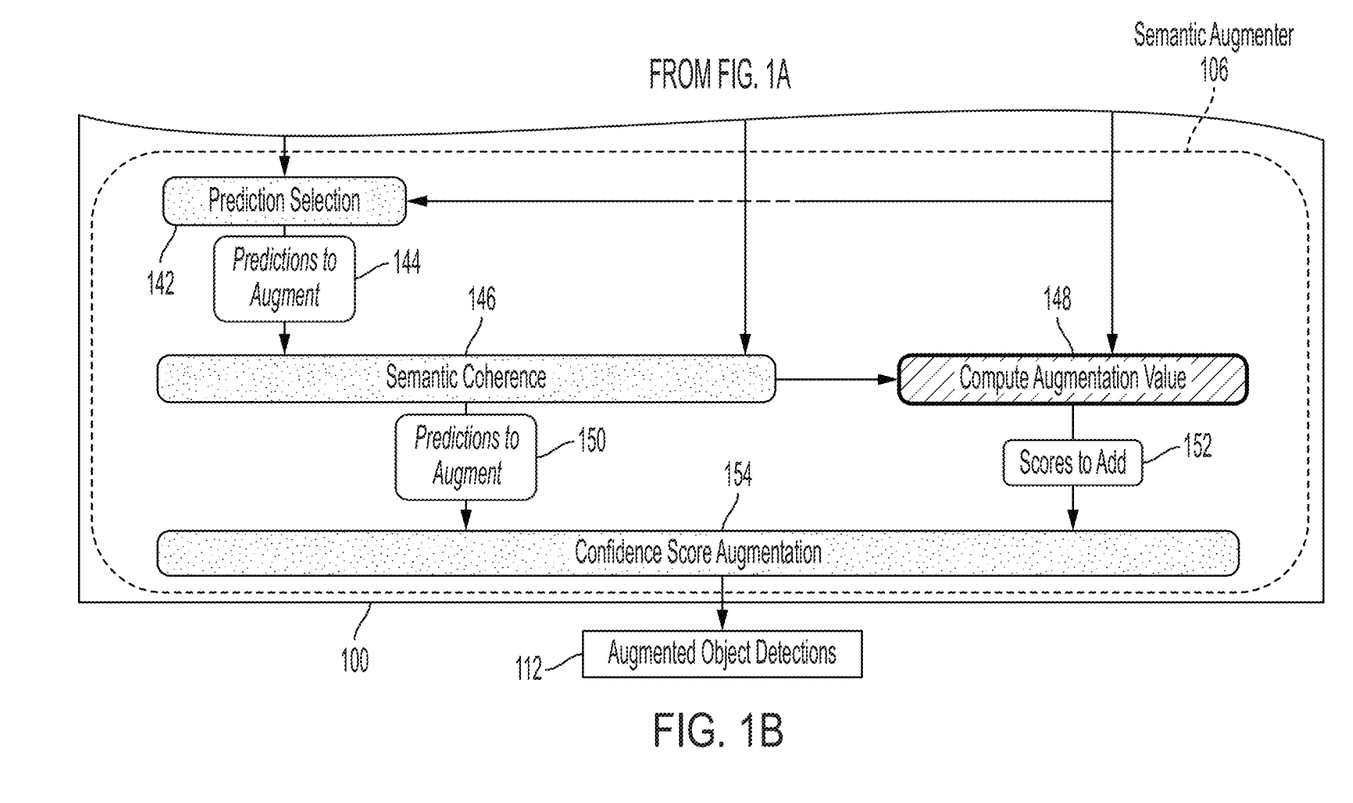

FIG. 1 is a flowchart of an augmented object detection method 100, in accordance with an embodiment.

The context extractor 102 receives object detection tasks 108 including expected labels for the objects which the object detection task 108 expects to detect. For example, the object detection tasks 108 may be tasks related to train operation and safety and some of the expected objects may be signals, signs and other common wayside objects. Example of objects detection tasks are obstacle detection in front of an operating vehicle e.g., train, car, boat, submarine, drone or plane; detecting abnormal situations where particular objects might be detected in the context of security in city, airport, train, manufacturing plants.

A knowledge graph selection module 116 processes the object detection tasks 108 to determine the expected labels found for the object detection task and selects appropriate knowledge graphs 118 from the available knowledge graphs stored in a knowledge graph database 114 by selecting the knowledge graphs 118 that include the expected labels.

A label is a word that signifies an object, a class of objects, a category of objects or a component of an object. For example "PERSON", "MAN", "BOAT" and "NOSE" are labels.

A knowledge graph 114 is a database of labels and semantic links. A semantic link 122 defines the relationships between objects represented by labels. For example, the semantic link ""NOSE" is a part of "FACE"" defines the relationship between a nose and a face.

A knowledge graph database 114 catalogs semantic links between labels (objects, concepts and categories). The semantic links relate the objects, concepts and categories to each other. When objects are identified in an image and those objects are semantically linked, confidence in the accuracy of the identification is enhanced because the identification is supported by a human-understandable causality.

Knowledge graph databases 114 are selected according to their relevancy to the expected objects, concepts and categories of the object detection task.

For the expected labels associated with the object detection tasks 108, a context extraction module 120 extracts and outputs the semantic links 122 associated with the expected labels.

The object detector 104 is a trained machine learning algorithm, such as a DNN, Region-Based Convolutional Neural Network (RCNN), or other appropriate neural network. RCNN are a family of techniques for addressing object localization and recognition tasks, designed for model performance.

In accordance with an embodiment, object detector 104 is a programmed neural network that receives images 110 as inputs and outputs initial predictions 136 of object identifications including labels, bounding boxes and confidence scores.

A bounding box is a set of spatial coordinates defining the space in an image that contains an identifiable object.

A confidence score is an assessment (0-100%) of an identification by the object detector based on the historical success of previous identifications.

A region proposal network 126 analyzes the images to generate and select proposed regions of interest (ROI) 130.

Region proposal network 130 receives images 110 as input and identifies ROI 130 defining regions of the images that contain identifiable objects. The number of region proposals 130 output is set by optimized hyperparameters (HYP1) 128.

RCNN Hyperparameters 124 and Semantic Augmentation Hyperparameters 138 are parameters applied to the object detection and augmentation processes to set thresholds of confidence scores for detection and to the number of outputs for the searches. in at least one embodiment for example, a detection is made with a confidence score of 40% and the top 100 detections are returned as initial object predictions 136. The hyperparameters 128, 134 and 140 are optimized for a given object detection task by running test data and varying the hyperparameters to return a maximum number of detections and minimizing the number of false positive detections.

The region proposals 130 are further analyzed to identify initial object predictions 136 by a box predictor and pre-processing module 132. The box predictor and preprocessing module 132 is a programmed neural network that identifies initial predictions 136 including bounding boxes within the ROI, labels and confidence scores.

The initial predictions 136 are processed by the semantic augmenter 206. The confidence scores of the initial predictions 136 are compared to the thresholds 140. When the confidence score of initial predictions 136 are greater than the threshold 140, a prediction selection module 142 selects those initial predictions to augment 144. A higher threshold returns fewer detections for processing. A lower threshold returns more detections for processing. The threshold 140 is 40%, in accordance with an embodiment. Comparing the labels of the predictions to augment 144 with the semantic links between labels 222 generated by the context extractor 202, a semantic coherence module 146 determines which identifications are supported by the presence of labels that are semantically linked.

When the labels in the predictions to augment 144 are semantically linked, an augmentation value 152 is calculated by a Compute Augmentation Value module 148. The augmentation value 152 is calculated based on the number of semantic links 122 and thresholds 140.

A confidence score augmentation module receives the predictions to augment 150 from the semantic coherence module 146 and the augmentation value 152 from the compute augmentation value module 148 and augments the confidence score of the predictions to augment 150 by adding the augmentation value 152 to the confidence score. The predictions to augment 150 with augmented confidence scores are output as augmented object detections 112.

An augmented object detection 112 is an object detection with a confidence score that has been increased when semantic links 122 found in a knowledge graph 214 correspond to the identified objects. For example, supposing an image resulted in detections of both a "PADDLE" and a "BOAT", the confidence scores of both detections would be increased to reflect the semantic link "PADDLE" is an accessory of "BOAT" found in a knowledge graph.

Figure 2:
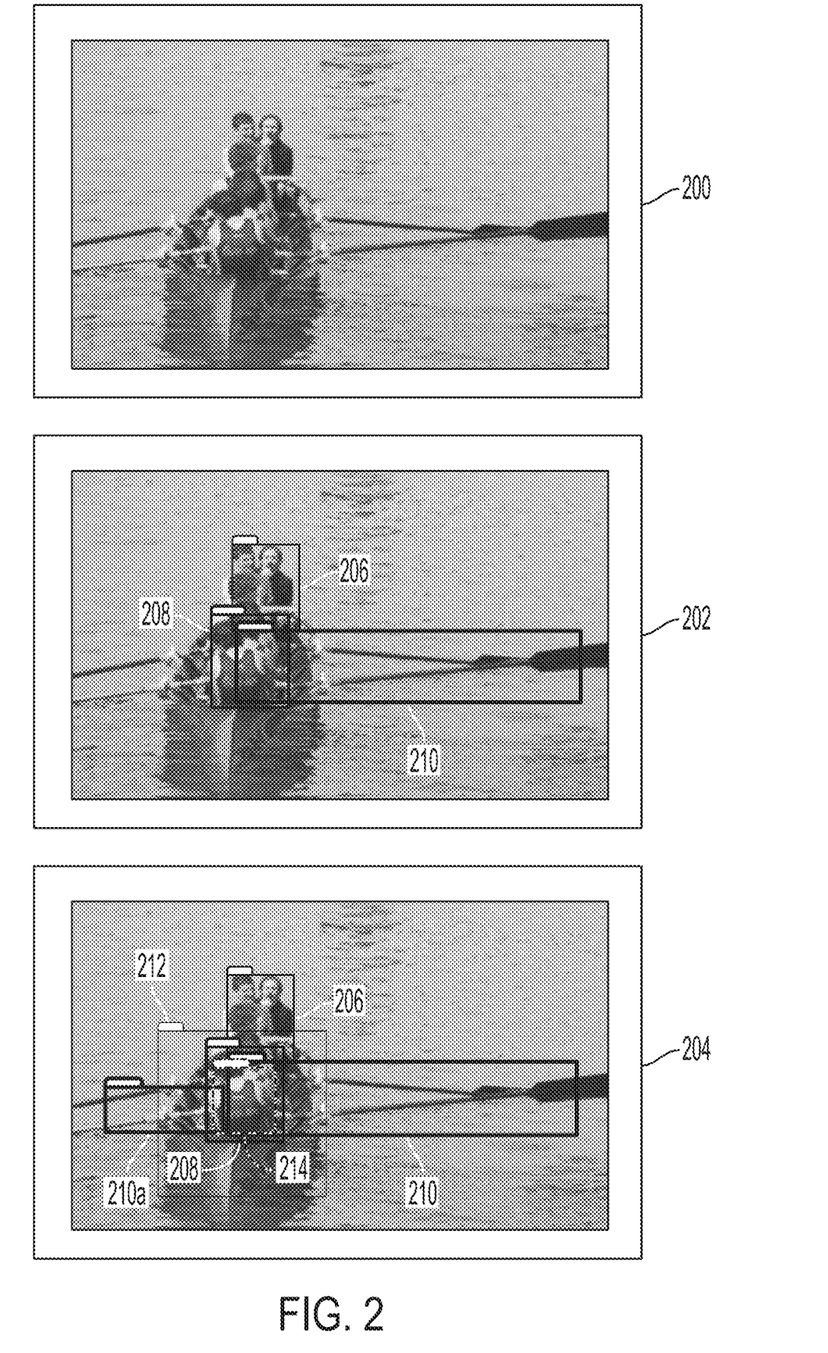
FIG. 2 is a series of images depicting semantic augmentation, in accordance with an embodiment.

FIG. 2 is a series of images depicting semantic augmentation, in accordance with an embodiment.

An object detection task is the detection of one or more objects and the identification of those objects. The objects are classified conceptually by categories from a finite set of categories. An object detector, such as object detector 104 in FIG. 1 analyzes an image 200 or sequence of images. As shown in image 102, the object detector 104 generates bounding boxes 206, 208 and 210 corresponding to initial predictions 136 identified in the image. The object detector uses a programmed neural network to find patterns within the image data that corresponds to previously identified objects defined spatially by a bounding box and a confidence score, the percentage of time such an identification has historically been correct. In this example, bounding box 206 is identified as "MAN". Bounding box 208 is identified as "PERSON". Bounding box 210 is identified as "PADDLE". The neural network determines a confidence score for each identification. As an example, "MAN" was identified with a confidence score of 46%, "PERSON" was identified with a confidence score of 66%, and "PADDLE" was identified with a confidence score of 50%. These three detections were returned because the threshold set by hyperparameter HYP2 134 is set at 40% and so only detections with a confidence score above 40% are output.

The reasoning for the identifications is embedded in the programming and generally cannot be explained to a person. The confidence scores provided by the object detector 104 reflect the programming of the neural network and not the context of the scene represented by the image.

By taking context into account, an augmented object detection method 100 uses semantic information relating detected objects to augment the confidence score. The confidence scores of all initial predictions 136 are augmented when semantic links are identified between the detections. Further objects are detected when confidence scores are augmented and are above the threshold. As shown in image 204, the augmented object detection has identified additional bounding boxes 210a, 212 and 214. After augmentation, bounding box 206 is identified as "MAN" with a confidence score of 56%, bounding box 208 is identified as "PERSON" with a confidence score of 66%, bounding boxes 210 and 210a are identified as "PADDLE" with a confidence score of 74%, bounding box 212 is identified as "BOAT" with a confidence score of 58% and bounding box 214 is identified as "LIFEJACKET" with a confidence score of 52%. In this example, the presence of paddles increases the confidence in the detection of a boat, a second paddle and a lifejacket. The detection of a person and a boat increases the confidence in the detection of a man. The increased confidence in the detections allows systems using the output to place an increased reliance on the object detections. The presence of semantic links between identified objects is a reasonable explanation for accepting an object detection as valid.

Figure 3:
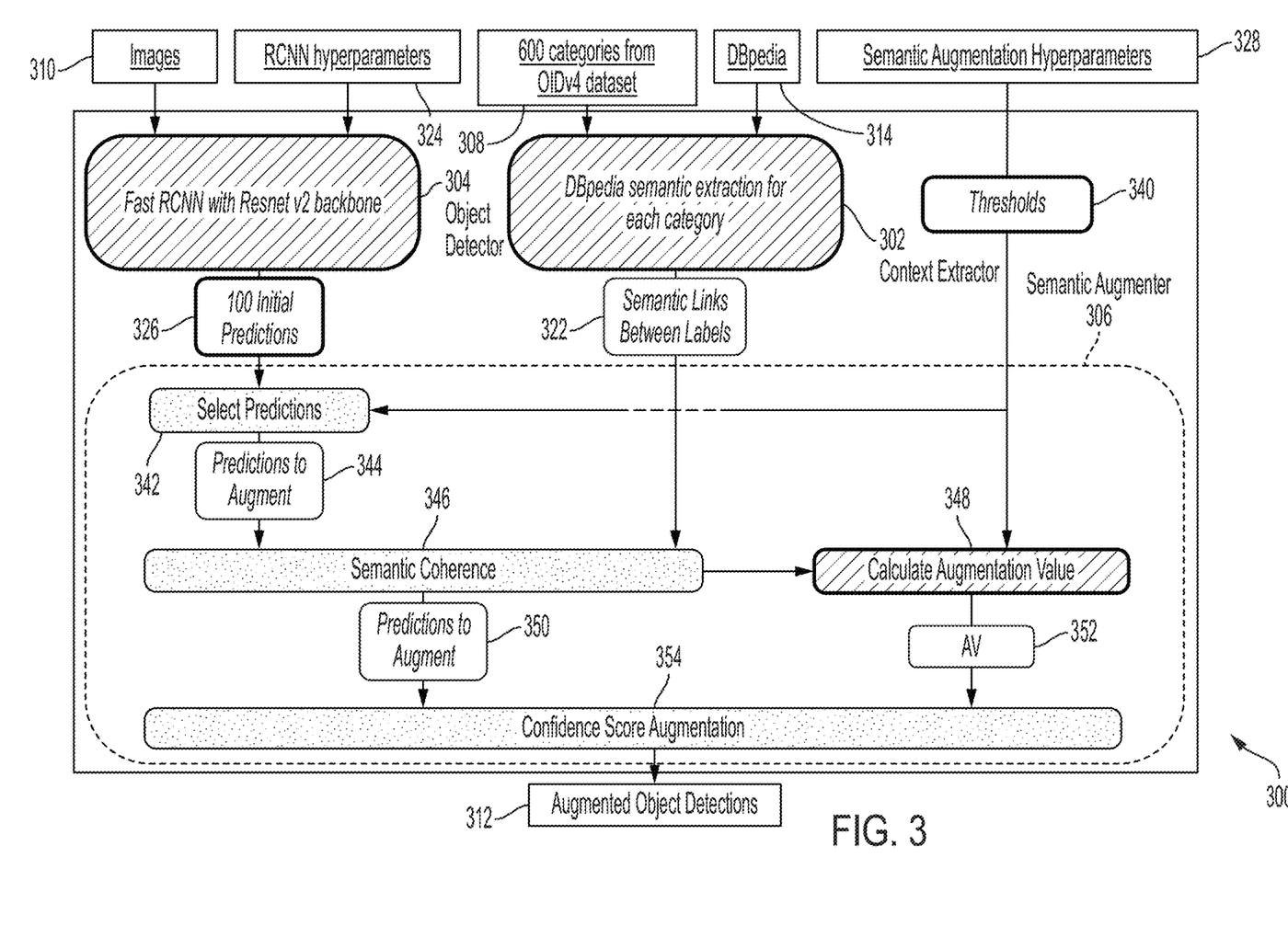
FIG. 3 is a flowchart of a semantic object detection method, in accordance with some embodiments.

FIG. 3 is a flowchart of an augmented object detection system and method 300, in accordance with an embodiment. The augmented object detection method 300 includes a context extractor 302, an object detector 304 and a semantic augmenter 306. The augmented object detection method 300 receives object detection tasks 308, for example categories from a dataset, and images 310 and outputs augmented object detections 312.

The Open Image Dataset (https://arxiv.org/abs/1811.00982) released by Google (OIDv4) is the largest existing dataset with object location annotation, containing 15.4 M bounding-boxes for 600 categories on 1.9 M images (2 M have been hand annotated). The dataset provides the granularity needed to assess global coherency of a detected scene.

Training of the neural network for the object detector 304 on this dataset is performed using a pre-trained detection model. Among the pretrained models on OIDv4 available online, the Faster RCNN with ImageNet pre-trained Inception Resnet v2 provides a compromise between detection performance and speed.

The context extractor 302 receives object detection tasks 308 including labels corresponding to expected objects for detection. Using semantic information from DBpedia 314, the context extractor 302 extracts semantic information for each category and label and outputs the semantic links 322 between the labels.

The knowledge graphs 314 used for semantic context extraction include, in accordance with an embodiment, DBpedia (https://wiki.dbpedia.org/) is an efficient graph to extract a unique resource for the 600 categories (95% of coverage).

In accordance with an embodiment, the object detector 304 is a Faster RCNN with Resnet v2 backbone. Using RCNN hyperparameters 324 such as threshold limits, the object detector 304 identifies 100 initial object predictions 326.

The 100 initial object predictions 336 are processed by the semantic augmenter 306. Comparing semantic augmentation hyperparameters 338 such as thresholds 340, a select predictions module selects predictions to augment 344. Using the semantic links between labels 322 generated by the context extractor 302, a semantic coherence module 346 compares the predictions to augment 344 with the semantic links between labels 322.

When semantic links are identified between the labels of the predictions to augment 344, a calculate augmentation value module 348 calculates an augmentation value (AV) 352 using the number of semantic links and thresholds 340. The augmentation value is added to the confidence scores of the predictions to augment 350 at the confidence score augmentation module 354. The confidence score augmentation module 354 outputs augmented object detections 312.

The method semantically interprets objects in data, e.g., identifying an object as a car because the object has been identified as a vehicle with four wheels, windows, on a road, with people inside, or the like. A structured database, such as a knowledge graph, is used to correlate objects that compose the scene, and to extract a logical picture of the object interrelations.

The configuration of the faster-RCNN includes a region proposal network of 100 regions, with non-max suppression intersection over union (IoU) threshold at confidence score 0.7 to limit duplicate region detection, and no non-max suppression score threshold, so all regions are used in the non-max suppression. Then the second stage of the RCNN infers detections for these 100 regions, with no additional non-max suppression, so any duplicate regions are treated as unique. These 100 bounding boxes with detected classes are the 100 initial predictions 336.

Hyper-parameters, optimized during training, define thresholds. Detections with a confidence score less than a threshold are not augmented and do not contribute to confidence augmentation of another detection.

For each prediction with an initial score higher than the threshold, an augmented value 352 is derived. The augmented value 352 indicates if the contexts, i.e., the other detections on the image, are coherent with the detected category according to the semantic links between labels 322 extracted from DBpedia 314. The list of linked labels in semantic links between labels 322 are consulted. A check is made to determine if each linked label has been detected in the image 310 with a confidence score higher than the threshold. If a linked label is determined to have been detected in the image, the confidence score is added to the trustworthy indicator. If a linked label is determined not to have been detected in the image, the confidence score for that detection is not changed or is reduced. For each label detected, the linked labels are checked and the confidence score of the detection is augmented for each linked label also detected.

The augmented value 352 is compared to a predefined trustworthy threshold 340.

If the augmented value 352 is less than the trustworthy threshold 340, the initial detection score is unchanged or is reduced. The context does not bring more confidence about the detection.

If the augmented value 352 is higher than the trustworthy threshold 340, the initial detection score is augmented at step 354. To derive the score to add 352, the same indicator is computed as in the first step but does not include contributions where the augmented value 352 did not reach the trustworthy threshold 340 in the first step. This prevents bad predictions from resulting in an increase of confidence.

Figure 4:
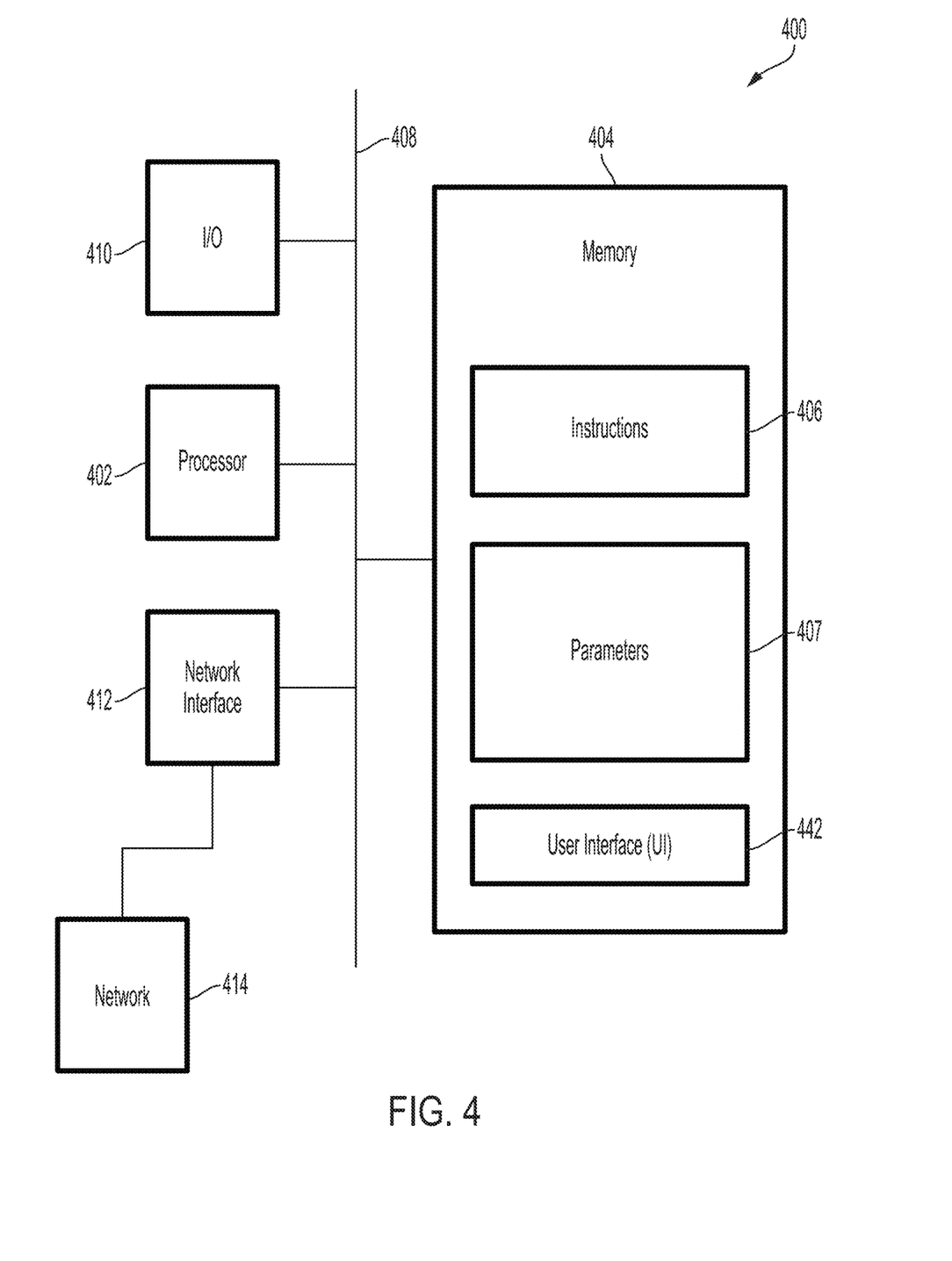
FIG. 4 is a high-level block diagram of a processor-based system usable in conjunction with one or more embodiments.

FIG. 4 is a block diagram of an object detection system 400, in accordance with some embodiments. In at least some embodiments, object detection system 400 performs augmented object detection method 100.

In some embodiments, object detection system 400 is a general purpose computing device including a hardware processor 402 and a non-transitory, computer-readable storage medium 404. Storage medium 404, amongst other things, is encoded with, i.e., stores, computer program code 406, i.e., a set of executable instructions. Execution of instructions 406 by hardware processor 402 represents (at least in part) an object detection tool which implements a portion or all of the methods described herein in accordance with one or more embodiments (hereinafter, the noted processes and/or methods).

Processor 402 is electrically coupled to computer-readable storage medium 404 via a bus 408. Processor 402 is also electrically coupled to an I/O interface 410 by bus 408. A network interface 412 is also electrically connected to processor 402 via bus 408. Network interface 412 is connected to a network 414, so that processor 402 and computer-readable storage medium 404 are capable of connecting to external elements via network 414. Processor 402 is configured to execute computer program code 406 encoded in computer-readable storage medium 404 in order to cause system 400 to be usable for performing a portion or all of the noted processes and/or methods. In one or more embodiments, processor 402 is a central processing unit (CPU), a multi-processor, a distributed processing system, an application specific integrated circuit (ASIC), and/or a suitable processing unit.

In one or more embodiments, computer-readable storage medium 404 is an electronic, magnetic, optical, electromagnetic, infrared, and/or a semiconductor system (or apparatus or device). For example, computer-readable storage medium 404 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 404 includes a compact disk-read only memory (CD-ROM), a compact disk-read/write (CD-R/W), and/or a digital video disc (DVD).

In one or more embodiments, storage medium 404 stores computer program code 406 configured to cause system 400 to be usable for performing a portion or all of the noted processes and/or methods. In one or more embodiments, storage medium 404 also stores information which facilitates performing a portion or all of the noted processes and/or methods. In one or more embodiments, storage medium 404 stores parameters 407.

Object detection system 400 includes I/O interface 410. I/O interface 410 is coupled to external circuitry. In one or more embodiments, I/O interface 410 includes a keyboard, keypad, mouse, trackball, trackpad, touchscreen, and/or cursor direction keys for communicating information and commands to processor 402.

Object detection system 400 also includes network interface 412 coupled to processor 402. Network interface 412 allows system 400 to communicate with network 414, to which one or more other computer systems are connected. Network interface 412 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 400.

Object detection system 400 is configured to receive information through I/O interface 410. The information received through I/O interface 410 includes one or more of instructions, data, design rules, libraries of standard cells, and/or other parameters for processing by processor 402. The information is transferred to processor 402 via bus 408. Object detection system 400 is configured to receive information related to a UI through I/O interface 410. The information is stored in computer-readable medium 404 as user interface (UI) 442.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of augmented semantic object detection in an image dataset comprising:
    receiving an object detection task including expected labels;
    selecting a knowledge graph that includes the expected labels;
    extracting semantic links relevant to the image dataset with the knowledge graph;
    detecting objects in the image dataset using a regional proposal network;
    determining initial predictions of detected objects, where the initial predictions of detected objects have confidence scores;
    comparing the confidence scores of the initial predictions of detected objects with a threshold;
    selecting detected objects from the initial predictions of detected objects for augmentation;
    comparing the selected detected objects with the semantic links; and
    augmenting the confidence scores based on the semantic links between the detected objects.

2. The method of claim 1, wherein extracting semantic links is performed by comparing expected labels from the object detection task with the knowledge graph to extract the semantic links for the expected labels.

3. The method of claim 2, wherein the detected objects have detected object labels and semantic links between the detected object labels are identified from the semantic links for the expected labels.

4. The method of claim 3, wherein the confidence scores are augmented for each semantic link identified between detected objects.

5. The method of claim 1, wherein detecting objects in the image dataset is performed using a trained neural network.

6. The method of claim 1, further comprising assessing the coherency by comparing the detected objects with semantic information from the knowledge graph.

7. The method of claim 1, wherein the confidence score is increased for each object detection that is semantically linked.

8. An augmented semantic object detection system comprising:
    a context extraction module receiving an object detection task including expected labels, selecting a knowledge graph data base that includes the expected labels based on the object detection task and extracting semantic links relevant to the object detection task from the knowledge graph database;
    an object detection module receiving an image dataset and using a regional proposal network;
        determining initial predictions of detected objects, where the initial predictions of detected objects have confidence scores;
        comparing the confidence scores of the initial predictions of detected objects with a threshold;
        selecting detected objects from the initial predictions of detected objects for augmentation; and
    a semantic augmentation module receiving the selected detected object, object detection confidence scores, and the extracted semantic links and augments the object detection confidence scores based on correlations between the object detections and the extracted semantic links.

9. The semantic object detection system of claim 8 wherein the object detection task includes expected labels and the semantic links are semantic links between the expected labels.

10. The semantic object detection system of claim 9, wherein the object detections include object detection labels corresponding to detected objects.

11. The semantic object detection system of claim 10, wherein the correlations are based on comparisons of the expected labels that are semantically linked and the detected object labels.

12. The semantic object detection system of claim 8 wherein the object detection module is a neural network.

13. The semantic object detection system of claim 9 wherein the knowledge graph database is DBpedia.

14. The semantic object detection system of claim 8 wherein the object detection module outputs object detections and object detection confidence scores when the object detection confidence scores exceed a threshold.

15. A method of augmented semantic object detection in an image dataset comprising:
- receiving an object detection task including expected labels;
- selecting a knowledge graph database based on an object detection task including expected labels;
- extracting semantic links between the expected labels from the knowledge graph database;
- processing an image dataset to generate object detections and object detection confidence scores using a regional proposal network;
- determining initial predictions of detected objects, where the initial predictions of detected objects have confidence scores;
- comparing the confidence scores of the initial predictions of detected objects with a threshold;
- selecting detected objects from the initial predictions of detected objects for augmentation;
- comparing the selected detected objects to the extracted semantic links between expected labels;
- updating the object detection confidence scores based on the comparison of the object detections to the extracted semantic links.

16. The method of claim 15, wherein said object detection task includes comparing the object detection confidence score to a threshold and comparing the object detections to the extracted semantic links between expected labels when the confidence score is greater than the threshold.

17. The method of claim 15, wherein the object detection confidence score is increased for each object detection that is semantically linked.

18. The method of claim 15, wherein the knowledge graph database selection is performed by comparing the object detection labels with expected labels in the knowledge graph database.

19. The method of claim 15, wherein the object detection confidence score is unchanged when an object detection is not semantically linked.

20. The method of claim 17, wherein an increase in an object detection confidence score increases other object detection confidence scores.

* * * * *